United States Patent
Hirabayashi

(10) Patent No.: US 10,886,682 B2
(45) Date of Patent: Jan. 5, 2021

(54) DC MOTOR FOR STARTER

(71) Applicant: DENSO CORPORATION, Kariya (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 16/440,353

(22) Filed: Jun. 13, 2019

(65) Prior Publication Data

US 2019/0393662 A1 Dec. 26, 2019

(30) Foreign Application Priority Data

Jun. 22, 2018 (JP) .................................. 2018-119174
Mar. 13, 2019 (JP) .................................. 2019-046304

(51) Int. Cl.
| H01R 39/36 | (2006.01) |
| H01R 39/22 | (2006.01) |
| H02K 13/10 | (2006.01) |
| F02N 11/00 | (2006.01) |
| H01R 39/26 | (2006.01) |
| H01R 39/04 | (2006.01) |

(52) U.S. Cl.
CPC ............. *H01R 39/22* (2013.01); *F02N 11/00* (2013.01); *H01R 39/04* (2013.01); *H01R 39/26* (2013.01); *H02K 13/105* (2013.01)

(58) Field of Classification Search
CPC ........ H01R 39/22; H01R 39/04; H01R 39/26; F02N 11/00; H02K 13/105
See application file for complete search history.

(56) References Cited

U.S. PATENT DOCUMENTS

| 2003/0141777 A1* | 7/2003 | Otani ..................... H01R 39/22 310/251 |
| 2007/0013258 A1* | 1/2007 | Kobayashi ............. H01R 39/22 310/251 |
| 2019/0305652 A1 | 10/2019 | Hirabayashi et al. |

FOREIGN PATENT DOCUMENTS

JP S59-185138 A 10/1984

* cited by examiner

Primary Examiner — Alexander Talpalatski
(74) Attorney, Agent, or Firm — Oliff PLC

(57) ABSTRACT

A DC motor is provided for use in a starter that starts an ermine. The DC motor includes a commutator and a brush. The commutator is formed of copper or a copper alloy whose copper percentage content is higher than or equal to 99 mass %. The brush is arranged in sliding contact with a surface of the commutator. Moreover, the brush is formed of a sintered compact that contains graphite, copper and at least one metal sulfide solid lubricant. The percentage content of copper in the sintered compact is 30-70 mass %. The at least one metal sulfide solid lubricant includes tungsten disulfide. The percentage content of tungsten disulfide in the sintered compact is higher than or equal to 6.5 mass %.

11 Claims, 7 Drawing Sheets

DC MOTOR FOR STARTER

CROSS-REFERENCE TO RELATED APPLICATIONS

This application is based on and claims priority from Japanese Patent Applications No. 2018-119174 filed on Jun. 22, 2018 and No. 2019-46304 filed on Mar. 13, 2019, the contents of which are hereby incorporated by reference in their entirety into this application.

BACKGROUND

1 Technical Field

The present disclosure relates to DC t motors for starters that start engines.

2 Description of Related Art

In recent years, with the spread of vehicles equipped with idle stop systems (or engine automatic stop/restart systems), the number of times starters start engines of vehicles had been increased.

Accordingly, it has been desired to extend the service lives of brushes of DC (Direct Current) motors used in the starters; various techniques have been developed to suppress wear of the brushes.

Moreover, it also has been desired to increase the surface hardness of commutators on which the brushes slide, thereby suppressing wear of the commutators.

SUMMARY

According to the present disclosure, there is provided a DC Motor for a starter that starts an engine. The DC motor includes a commutator and a brush. The commutator is formed of copper or a copper alloy whose copper percentage content is higher than or equal to 99 mass %. The brush is arranged in sliding contact with a surface of the commutator. Moreover, the brush is formed of a sintered compact that contains graphite, copper and at least one metal sulfide solid lubricant. The percentage content of copper in the sintered compact is 30-70 mass %. The at least one metal sulfide solid lubricant includes tungsten disulfide. The percentage content of tungsten disulfide in the sintered compact is higher than or equal to 6.5 mass %.

DESCRIPTION OF EMBODIMENTS

Figure 1:
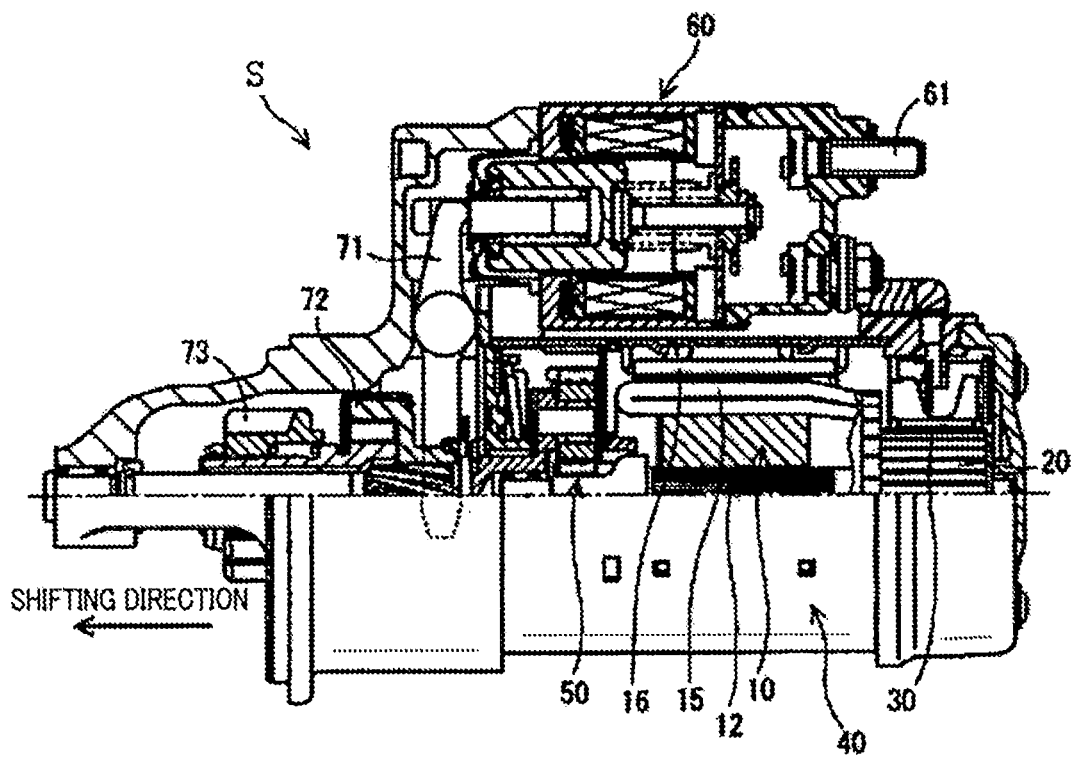
FIG. 1 is a partially cross-sectional view of a starter which includes a DC motor according to an exemplary embodiment.

For example, Japanese Patent Application Publication No. JPS59185138A discloses a technique of forming a hard coating layer, whose main component is a nitride or carbide of Ti or Ta and thickness is 1-2 μm, on the surface of a commutator by sputtering or ion plating.

However, it is impossible to maintain the hard coating layer of 1-2 μm over a long period of time; thus it is impossible to ensure the durability of the commutator.

That is, it is necessary to suppress wear of commutators as well as wear of brushes in DC motors.

In addition, forming the hard coating layer by sputtering or ion plating lowers the productivity and increases the material cost, resulting in an increase in the manufacturing cost.

On the other hand, there have been known DC motors configured to form a graphite film on the surface of a commutator by transferring graphite included in brushes to the surface of the commutator via sliding movement between the brushes and the commutator. With the graphite film, it is possible to suppress generation of sparks between the brushes and the commutator. However, the hardness of the graphite film is not enough to reliably suppress wear of the commutator.

Moreover, metal sulfide solid lubricants, such as tungsten disulfide, have been used as lubricants for improving the slidability between brushes and commutators in DC motors. However, the percentage content of metal sulfide solid lubricants in brushes have been set to be lower than or equal to 5 mass %. This is because it is common technical knowledge that setting the percentage content of metal sulfide solid lubricants in brushes to be lower than or equal to 5 mass % is enough to ensure the lubricity.

In contrast, the inventor of the present application has found, through experimental investigation, that a graphite film having a higher hardness than conventional graphite films can be obtained by setting the percentage content of tungsten disulfide in a sintered compact forming a brush to be higher than 5 mass %.

Specifically, based on the finding of the inventor, in the DC motor according to the present disclosure, the percentage content of tungsten disulfide in the sintered compact is set to be higher than or equal to 6.5 mass %.

Setting the percentage content of tungsten disulfide in the sintered compact as above, during operation of the DC motor, the tungsten disulfide contained in the sintered compact reacts with graphite due to heat generated by supply of electric power to the DC motor and the sliding movement between the brush and the commutator. Consequently, the tungsten disulfide is changed into tungsten carbide which is a hard compound. As a result, tungsten carbide is contained in the graphite film formed on the surface of the commutator, thereby improving the hardness of the graphite film to become higher than the hardnesses of conventional graphite films.

That is, in the DC motor according to the present disclosure, the graphite film is not originally formed on the surface of the commutator. Instead, the graphite film is formed with operation of the DC motor, without performing any additional process. Consequently, it becomes possible to form the graphite film at low cost. Moreover, the graphite film is continuously formed with the sliding movement between the brush and the commutator. Therefore, the graphite film can be maintained to the end of the service life of the brush.

Furthermore, part of the tungsten disulfide transferred from the brush to the graphite film remains in its original form (i.e., not changed into tungsten carbide). That is, the graphite film formed on the surface of the commutator contains tungsten disulfide that is a metal sulfide solid lubricant. Consequently, the graphite film is excellent in lubricity as well as in hardness.

Accordingly, with the graphite film formed on the surface of the commutator, it is possible to suppress wear of the commutator, thereby extending the service life of the commutator. Further, by suppressing wear of the commutator, it is possible to suppress the dimensional accuracy of the commutator from being lowered due to uneven wear of the commutator. Consequently, it is possible to suppress generation of sparks due to the lowering of the dimensional accuracy of the commutator, thereby extending the service life of the brush as well.

FIG. 1 shows the overall structure of a starter S that includes a DC motor 40 according to an exemplary embodiment.

In the present embodiment, the starter S is designed to be used in a vehicle, which is equipped with an idle stop system, to start an engine of the vehicle.

As shown in FIG. 1, the starter S further includes a speed reducer 50 and an electromagnetic switch 60 in addition to the DC motor 40.

The speed reducer 50 is configured to transmit rotation of the DC motor 40, through speed reduction, to a pinion gear 73. The speed reducer 50 is implemented by, for example, a planetary gear mechanism.

The electromagnetic switch 60 is configured to selectively make and break electrical connection for supplying electric power to the DC motor 40.

Specifically, the electromagnetic switch 60 includes: an excitation coil (or solenoid); a plunger slidably provided on an inner periphery of the excitation coil; a fixed core; a movable contact held by the plunger; and a pair of fixed contacts provided inside the electromagnetic switch 60 and respectively connected with a battery-side terminal 61 and a motor-side terminal. The battery-side terminal 61 is electrically connected to a battery 80 (see FIG. 3) while the motor-side terminal is electrically connected to the DC motor 40.

In operation, the excitation coil is energized when electric current is supplied from the battery 80, which is provided outside the starter S, to a switch terminal (not shown) upon an ignition switch being turned on by, for example, a key operation by a user. Upon energization of the excitation coil, the plunger is attracted by the fixed core, causing a shift lever 71 to shift the pinion gear 73 to an opposite side to the DC motor 40 and thereby bring the pinion gear 73 into mesh with a ring gear of the engine. Moreover, upon the plunger being attracted by the fixed core, the movable contact is brought into contact with the pair of fixed contacts, causing electric power to be supplied from the battery 80 to the DC motor 40 via the battery-side terminal 61 and the motor-side terminal. Consequently, the DC motor 40 rotates with the electric power supplied from the battery 80; the rotation of the DC motor 40 is transmitted to the ring gear of the engine via the speed reducer 50, a one-way clutch 72 and the pinion gear 73, thereby starting the engine.

The DC motor 40 includes a rotor 10 that serves as an armature of the DC motor 40. The rotor 10 includes a rotating shaft 12, a rotor coil 15 provided around the rotating shaft 12, and a commutator 20 provided on an end portion of the rotating shaft 12 and electrically connected with the rotor coil 15.

In the present embodiment, the DC motor 40 is configured as a magnet field-type motor. Specifically, the DC motor 40 includes magnets 16 that serve as a field of the DC motor 40. The magnets 16 are fixed on an inner circumferential surface of a yoke of the DC motor 40. In addition, the rotor coil 15 is located radially inside the magnets 16.

The commutator 20 is comprised of a plurality of commutator segments 21 that are circumferentially spaced at equal intervals and each electrically connected with the rotor coil 15.

In the present embodiment, the commutator 20 is formed of copper or a copper alloy whose copper percentage content is higher than or equal to 99 mass %. More particularly, the commutator 20 is formed of a copper alloy containing silver or phosphorous deoxidized copper.

It should be noted that the commutator 20 has at least its surface 20A and its electrically-conducting portion formed of copper or a copper alloy whose copper percentage content is higher than or equal to 99 mass %. In addition, the surface 20A of the commutator 20 is comprised of the surfaces of the commutator segments 21.

Figure 2:
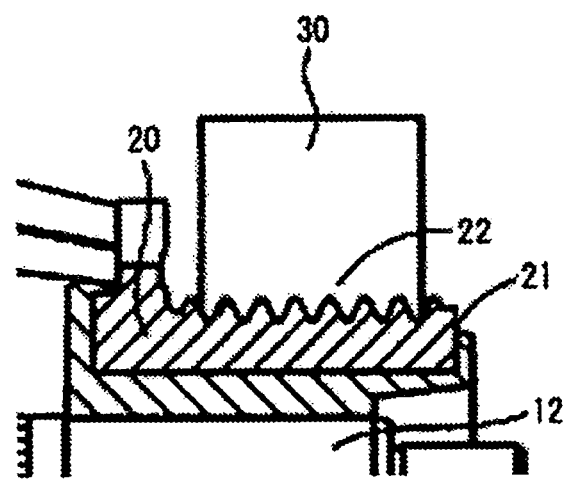
FIG. 2 is an enlarged cross-sectional view of part of the DC motor.

The DC motor 40 also includes a plurality of brushes 30 that are arranged in sliding contact with the commutator 20 (i.e., the commutator segments 21). As shown in FIG. 2, on a radially outer periphery of the commutator 20, there is formed an uneven portion 22. The uneven portion 22 includes protrusions and recesses that are formed alternately in an axial direction of the rotating shaft 12 and each extend along the sliding direction of the brushes 30 (or circumferential direction of the rotating shaft 12). With the uneven portion 22, it is possible to stabilize the sliding contact between the brushes 30 and the commutator 20, thereby suppressing generation of sparks due to the sliding contact.

In operation, electric power is supplied from the battery 80 to the rotor coil 15 via the sliding contact between the brushes 30 and the commutator 20, causing the rotor 10 to rotate. Moreover, during no-load operation of the DC motor 40, the rotor 10 and thus the commutator 20 rotates at a circumferential speed higher than 30 m/s.

Figure 3:
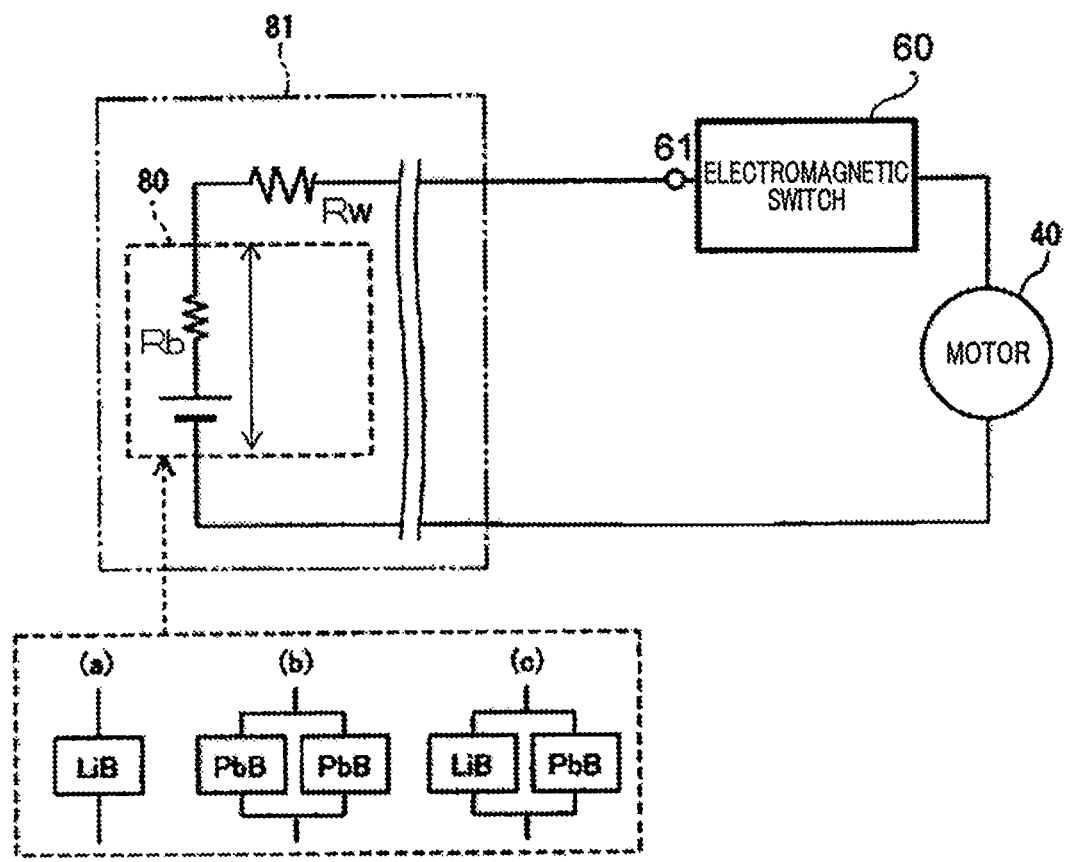
FIG. 3 is a circuit diagram illustrating the configuration of a starting circuit that is electrically connected with the DC motor via an electromagnetic switch.

FIG. 3 shows the configuration of a starting circuit 81 that is electrically connected with the DC motor 40 via the electromagnetic switch 60.

In conventional starting circuits, a single lead-acid battery is employed to supply electric power to a starter. In this case, the open-circuit voltage of the lead-acid battery is in the range of 11-14V; the circuit resistance, which is the sum of the wiring resistance and the internal resistance of the lead-acid battery, is in the range of 6-8 mΩ.

On the other hand, in recent years, lithium ion batteries have been employed in starting circuits to reduce the weight and improve the charging efficiency.

In the present embodiment, the battery 80 included in the starting circuit 81 may be implemented by a single lithium ion battery (LiB) as shown in FIG. 3(a), by a pair of lead-acid batteries (PbB) connected in parallel to each other as shown in FIG. 3(b), or by a lithium ion battery (LiB) and a lead-acid battery (PbB) that are connected in parallel to each other as shown in FIG. 3(c). In each of these cases, the open-circuit voltage of the battery 80 is in the range of 11-14V; the circuit resistance R, which is the sum of the wiring resistance Rw and the internal resistance Rb of the battery 80, is lower than 5 mΩ. Consequently, it is possible to increase the voltage applied to the DC motor 40, thereby increasing the rotational speed of the DC motor 40.

More particularly, in the present embodiment, the voltage applied to the DC motor 40 when starting the engine at an ambient temperature of, for example, 25° C. is about 12V. The electric current flowing in the DC motor 40 during operation of the DC motor 40 may exceed 100 A.

As described previously, in the present embodiment, the DC motor 40 is configured as a magnet field-type motor. Therefore, in the DC motor 40, more sparks are generated between the commutator 20 and the brushes 30 and the commutator 20 and the brushes 30 are worn more than in a winding field-type motor. Moreover, with the configuration of the starting circuit 81 described above, the rotational speed of the DC motor 40 is increased, causing more sparks to be generated between the commutator 20 and the brushes 30 and increasing wear of the commutator 20 and the brushes 30.

Furthermore, with increase in the sparks generated between the commutator 20 and the brushes 30, it may become easy for the uneven portion 22 of the commutator 20 to be worn down. Consequently, it may become possible to lose, in an early stage, the effect of the uneven portion 22 on stabilization of the sliding contact between the brushes 30 and the commutator 20.

To solve the above problem, in the present embodiment, the brushes 30 are configured to form, with sliding movement between the brushes 30 and the commutator 20, a graphite film. (or thin graphite layer) 25 on the surface 20A of the commutator 20; the graphite film 25 contains hard compounds.

Figure 4:
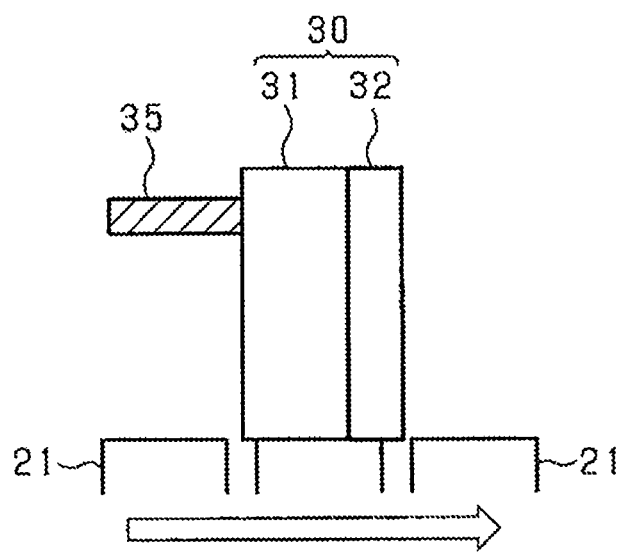
FIG. 4 is a schematic view illustrating the sliding movement between a brush and a commutator of the DC motor.
Figure 5:
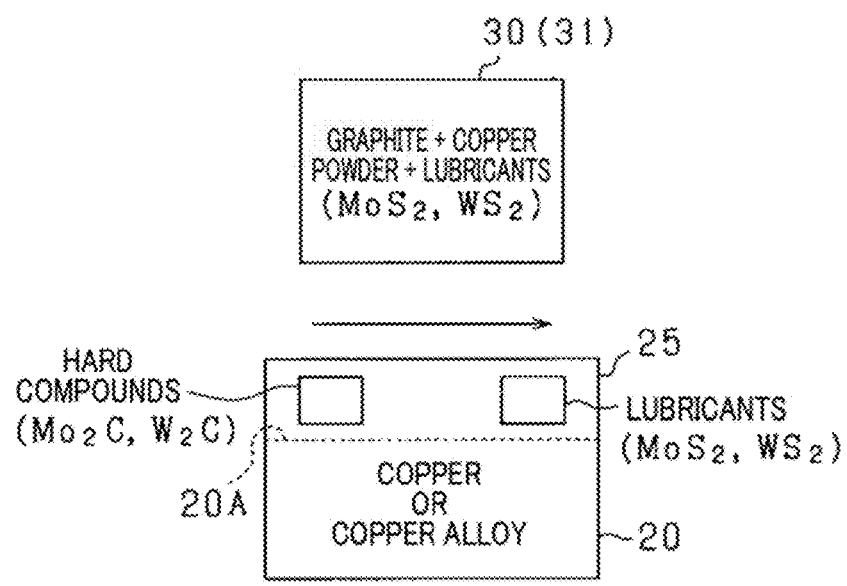
FIG. 5 is a schematic view illustrating both the composition of the brush and the composition of a graphite film formed on the surface of the commutator.

FIG. 4 illustrates the sliding movement between each of the brushes 30 and the commutator 20. FIG. 5 shows both the composition of each of the brushes 30 and the composition of the graphite film 25 formed on the surface 20A of the commutator 20. In addition, it should be noted that arrows in FIGS. 4 and 5 indicate the sliding direction of the commutator 20 with respect to each of the brushes 30.

In the present embodiment, each of the brushes 30 is formed of a sintered compact (or sintered body) that contains graphite and copper.

As shown in FIG. 4, each of the brushes 30 has a pigtail 35 embedded in a side surface thereof; the pigtail 35 is electrically connected to the motor-side terminal of the electromagnetic switch 60.

In the present embodiment, each of the brushes 30 is multi-layer structured to include a first layer 31 and a second layer 32 that are arranged in alignment with each other in the direction of rotation of the commutator 20 (or the sliding direction of the commutator 20 with respect to the brushes 30). During rotation of the commutator 20, with respect to each of the commutator segments 21, the first layer 31 first makes sliding contact with the commutator segment 21 and then the second layer 32 makes sliding, contact with the commutator segment 21.

The first layer 31 has a higher copper content and a lower resistance than the second layer 32. Moreover, the second layer 32 has a smaller thickness than the first layer 31 in the direction of rotation of the commutator 20.

More particularly, in the present embodiment, for each of the brushes 30, the sintered contact forming the brush 30 consists of a first sintered compact forming the first layer 31 and a second sintered compact forming the second layer 32. The percentage content of copper (or copper powder) in the first sintered compact (i.e., in the first layer 31) is 30-70 mass %, whereas the percentage content of copper in the second sintered compact (i.e., in the second layer 32) is 10-30 mass %.

It is preferable that the first layer 31 of each of the brushes 30 contains, as metal sulfide solid lubricants, molybdenum disulfide ($MoS_2$) and tungsten disulfide ($WS_2$). It is also preferable that the second layer 32 of each of the brushes 30 contains, as a metal sulfide solid lubricant, molybdenum disulfide, but no tungsten disulfide.

With the sliding movement of the first layer 31 of each of the brushes 30, which contains graphite, tungsten disulfide and molybdenum disulfide, on the commutator 20, the graphite film 25 is formed on the surface 20A of the commutator 20. As the name suggests, the main component of the graphite film 25 is graphite. The graphite film 25 has such a hardness as to be capable of suppressing generation of sparks between he brushes 30 and the commutator 20 and thus wear of the brushes 30 and the commutator 20.

Specifically, the graphite film 25 contains graphite, tungsten disulfide and molybdenum disulfide, which are transferred from the brushes 30. Moreover, the graphite film 25 also contains hard compounds that are formed by chemical reactions of tungsten disulfide and molybdenum disulfide, which are metal sulfide solid lubricants, with graphite; these hard compounds include carbides such as molybdenum carbide (Mo2C) and tungsten carbide (W2C).

Figure 6:
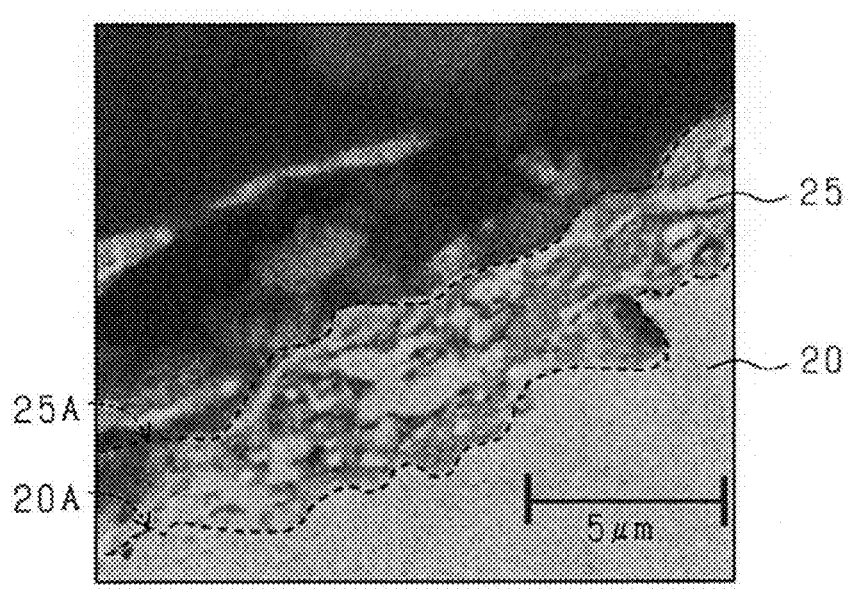
FIG. 6 is a cross-sectional photograph of the graphite film and the surface of the commutator, which is taken by an SEM.

FIG. 6 is a cross-sectional photograph of the graphite film 25 and the surface 20A of the commutator 20, which is taken by an SEM (Scanning Electron Microscope).

As can be seen from FIG. 6, after operation of the DC motor 40, there is formed the graphite film 25 on the surface 20A of the commutator 20.

Figure 7:
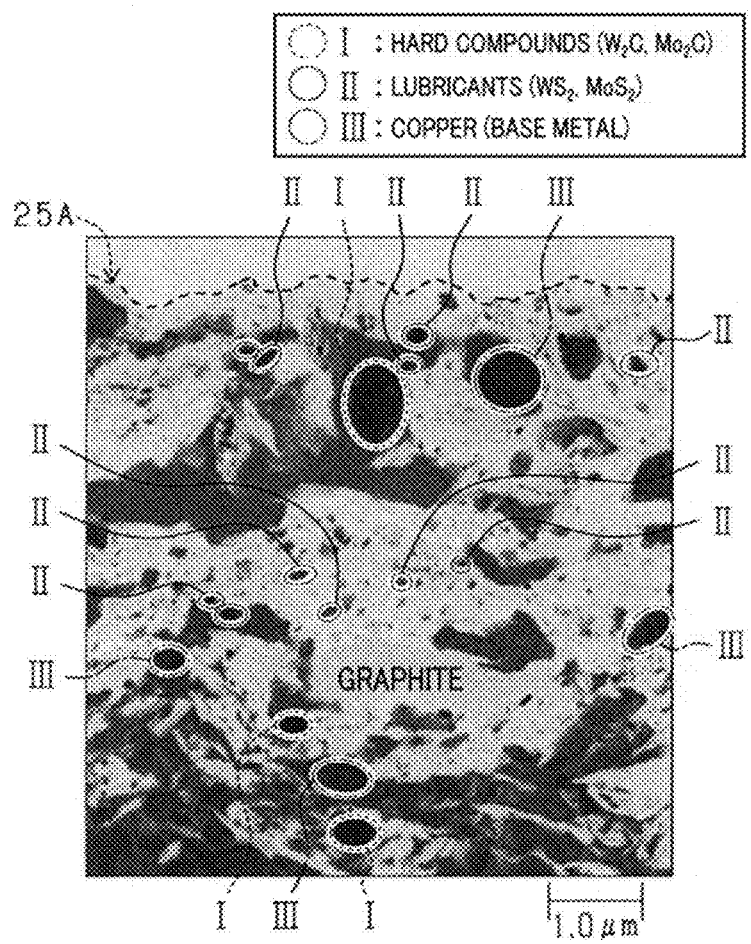
FIG. 7 is an enlarged cross-sectional photograph of the graphite film, which is taken by a TEM.

FIG. 7 is an enlarged cross-sectional photograph of the graphite film 25, which is taken by a TEM (Transmission Electron Microscope).

In FIG. 7, "I" enclosed with dashed lines designates molybdenum carbide and tungsten carbide, which are hard compounds. "II" enclosed with continuous lines designates tungsten disulfide and molybdenum disulfide, which are metal sulfide solid lubricants. "III" enclosed with chain lines designates copper, which originated from the base metal of the commutator 20 or from the brushes 30.

As can be seen from FIG. 7, the graphite film 25 contains the hard compounds. the metal sulfide solid lubricants and copper in addition to graphite. Moreover, the main component of the graphite film 25 is graphite. Furthermore, part of the metal sulfide solid lubricants transferred from the brushes 30 remain in their original forms (i.e., not changed into the bard compounds by chemical reactions with graphite). Consequently, the graphite film 25 is excellent in lubricity as well as in hardness.

Figure 8:
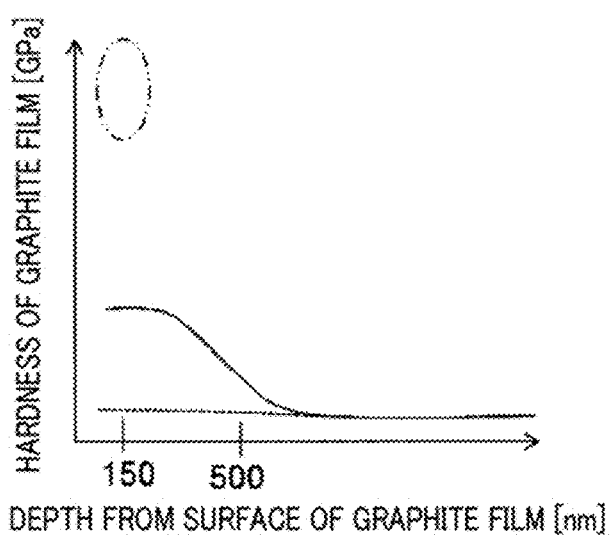
FIG. 8 is a graphical representation illustrating the relationship between the depth from the surface of the graphite film and the hardness of the graphite film.

FIG. 8 shows the relationship between the depth from the surface 25A of the graphite film 25 and the hardness of the graphite film 25.

In FIG. 8, the continuous line represents the hardness of the graphite film 25 according to the present embodiment, which contains the hard compounds. The dashed line represents the hardness of the commutator 20 with no graphite film 25 formed thereon. The two-dot chain line represents the hardness of the hard compounds alone.

The hardness of the graphite film 25 shown in FIG. 8 was measured by a nanoindentation continuous stiffness measurement using a Nanoindenter Xp that is a product of MTS Systems Corporation.

Specifically, in the measurement, a triangular pyramid-shaped indenter (or Berkovich indenter), which is made of diamond, was pressed into the surface 25A of the graphite film 25 at a constant strain rate of 0.05/s and a Z-direction indenter vibration frequency of 45 Hz. Then, the profile of the hardness in the depth direction was obtained by analyzing the load displacement curve that was determined during the pressing of the indenter into the surface 25A of the graphite film 25.

In addition, before measuring the hardness of the graphite film 25, the measurement was performed on a standard specimen that is made of fused quartz; the analysis results were such that the hardness was 9.5 GPa±5% when the depth was 100 nm or more.

In the measurement of the hardness of the graphite film 25, with increase in the pressing depth of the indenter, the hardness of copper, which is the base metal of the commutator 20, was detected and thus the measured harness was decreased. Therefore, the hardness in a hardness fiat region, which was observed when the pressing depth was small, was detected as the hardness of the graphite film 25.

More specifically, the measurement was conducted at a plurality of points (e.g., 20 to 50 points) in a front half of the graphite film 25 formed on one commutator segment 21 (i.e., half of the graphite film 25 on the front side in the sliding direction of the commutator 20 with respect to the brushes 30); these points are spaced in both the longitudinal and lateral directions at intervals of, for example, 500 μm or more. Then, from all the measured values of the hardness of the graphite film 25, a predetermined number of the measured values were sequentially removed to minimize variation in the measured values at a predetermined depth (e.g., 150 nm). Thereafter, an averaging process was performed on the remaining measured values.

As can be seen from FIG. 8, the hardness of the graphite film 25 according to the present embodiment, which contains the hard compounds, is higher than the hardness of the base metal of the commutator 20 and lower than the hardness of the hard compounds. Moreover, with increase in the depth from the surface 25A of the graphite film 25, the hardness of the graphite film 25 approaches the hardness of copper that is the base metal of the commutator 20. In addition, though not shown in FIG. 8, the hardness of the graphite film 25 according to the present embodiment is also higher than the hardness of a conventional graphite film which contains graphite only.

Next, the composition of the first sintered compact forming the first layer 31 of each of the brushes 30 will be described with reference to FIGS. 9-12.

Figure 9:
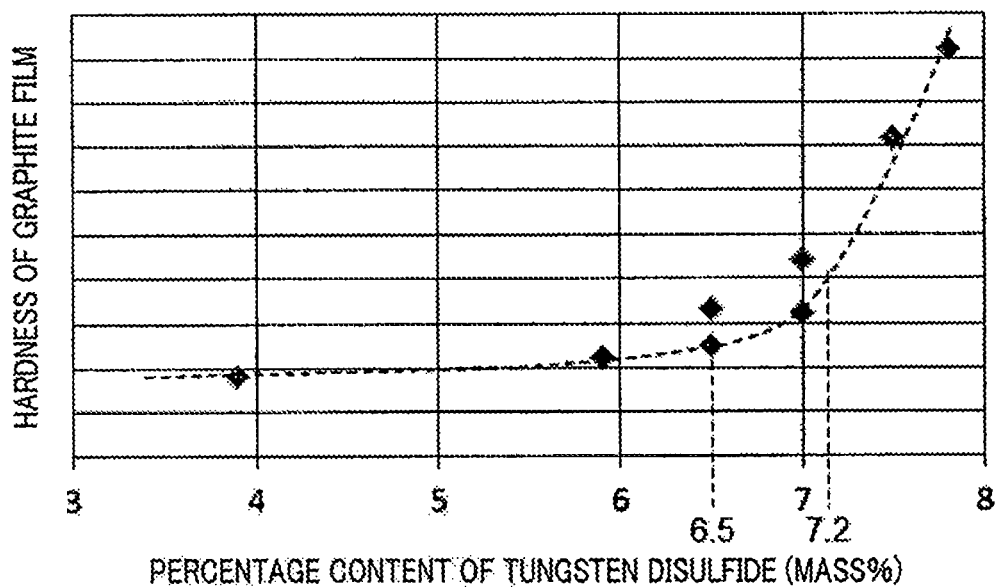
FIG. 9 is a graphical representation illustrating the relationship between the percentage content of tungsten disulfide in a first sintered compact forming a first layer of the brush and the hardness of the graphite film.

FIG. 9 shows the relationship between the percentage content of tungsten disulfide in the first sintered compact and the hardness of the graphite film 25 formed on the surface 20A, of the commutator 20.

In addition, the relationship shown in FIG. 9 has been determined by experimental investigation conducted by the inventor of the present application. Specifically, in the experimental investigation, the percentage content of tungsten disulfide in the first sintered compact was varied; the hardness of the graphite film 25 was measured at each of a plurality of values of the percentage content of tungsten disulfide in the first sintered compact.

Conventionally, metal sulfide solid lubricants, such as tungsten disulfide, have been used as lubricants for improving the slidability between brushes and commutators in DC motors. However, the percentage content of metal sulfide solid lubricants in brushes have been set to be lower than or equal to 5 mass %. This is because it is common technical knowledge that setting the percentage content of metal sulfide solid lubricants in brushes to be lower than its or equal to 5 mass % is enough to ensure the lubricity.

However, as can be seen from FIG. 9, When the percentage content of tungsten disulfide in the first sintered compact is lower than or equal to 5 mass %, it is impossible to improve the hardness of the graphite film 25.

In contrast, in the present embodiment, the percentage content of tungsten disulfide in the first sintered compact is preferably set to be higher than or equal to 6.5 mass %, and more preferably set to be higher than or equal to 7 mass %.

Setting the percentage content of tungsten disulfide in the first sintered compact as above, during operation of the DC motor 40, the tungsten disulfide contained in the first sintered compact reacts with graphite due to heat generated by supply of electric power to the DC motor 40 and the sliding movement between the brush 30 and the commutator 20. Consequently, the tungsten disulfide is changed into tungsten carbide which is a hard compound. As a result, tungsten carbide is contained in the graphite film 25 formed on the surface 20A of the commutator 20, thereby improving the hardness of the graphite film 25 to become higher than the hardnesses of conventional graphite films.

Figure 10:
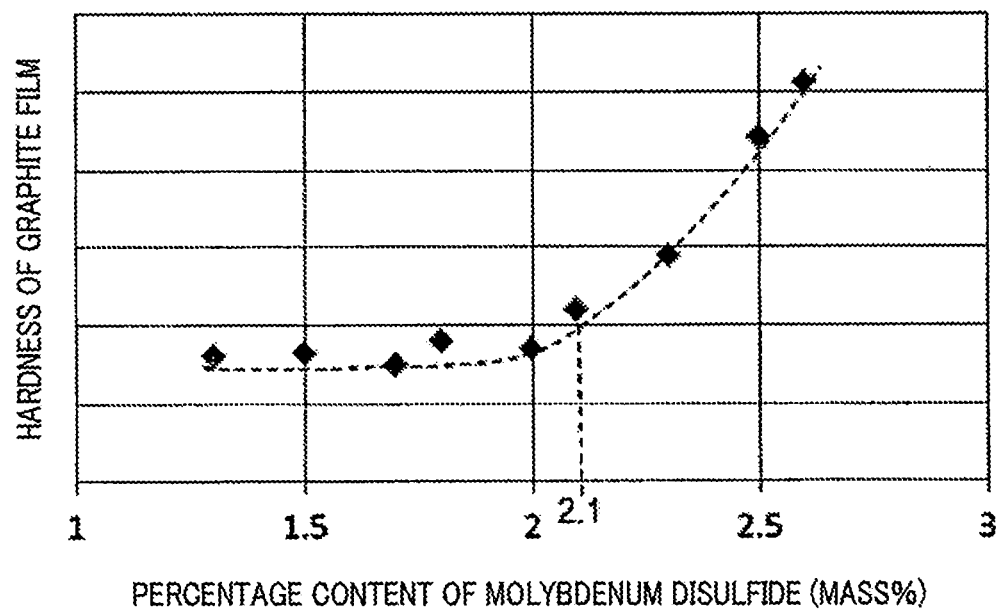
FIG. 10 is a graphical representation illustrating the relationship between the percentage content of molybdenum disulfide in the first sintered compact and the hardness of the graphite film.

FIG. 10 shows the relationship between the percentage content of molybdenum disulfide in the first sintered compact and the hardness of the graphite film 25.

In addition, the relationship shown in FIG. 10 has also been determined to by the experimental investigation conducted by the inventor. Specifically, in the experimental investigation, the percentage content of molybdenum disulfide in the first sintered compact was varied with the percentage content of tungsten disulfide in the first sintered compact fixed to 7.2 mass %; the hardness of the graphite film 25 was measured at each of a plurality of values of the percentage content of molybdenum disulfide in the first sintered compact.

In the present embodiment, the percentage content of molybdenum disulfide in the first sintered compact is set to be higher than or equal to 2 mass %.

Setting the percentage content of molybdenum disulfide in the first sintered compact as above, during operation of the DC motor 40, the molybdenum disulfide contained in the first sintered compact reacts with graphite due to heat generated by supply of electric power to the DC motor 40 and the sliding movement between the brush 30 and the commutator 20. Consequently, the molybdenum disulfide is changed into molybdenum carbide which is a hard compound. As a result, molybdenum carbide is contained, together with tungsten carbide, in the graphite film 25 formed on the surface 20A of the commutator 20, thereby further improving the hardness of the graphite film 25.

In addition, in the example shown in FIG. 10, the percentage content of tungsten disulfide in the first sintered compact is fixed to 7.2 mass %. Therefore, even when the percentage content of molybdenum disulfide in the first sintered compact is lower than 2 mass %, it is still possible to secure hardness required for the graphite film 25.

It is preferable that the mass of tungsten disulfide contained in the first sintered compact is greater than the mass of molybdenum disulfide contained in the first sintered compact. It is more preferable that the mass of tungsten disulfide contained in the first sintered compact is about three times the mass of molybdenum disulfide contained in the first sintered compact. Moreover, it is also preferable that the total mass of the metal sulfide solid lubricants contained in the first sintered compact is less than the mass of graphite contained in the first sintered compact.

In the present embodiment, with increase in the percentage content of the metal sulfide solid lubricants in the first sintered compact, the resistance of the brush 30 may increase.

On the other hand, in recent years, in DC motors of starters used in vehicles equipped with idle stop systems, the percentage content of copper in the brushes has been reduced to limit the amount of electric current supplied to the DC motors via the brushes. However, upon reduction in the percentage content of copper in the brushes, the influence of oxidation of the copper contained in the brushes becomes large, increasing the electrical resistances of the brushes. Therefore, to prevent oxidation of the copper in a high-temperature and high-humidity environment, brass, which contains zinc, is generally added to the brushes by about 5-6 mass %.

Moreover, with increase in the percentage content of the metal sulfide solid lubricants in the brushes, the copper contained in the brushes may be sulfurized, thereby increasing the electrical resistances of the brushes.

Figure 11:
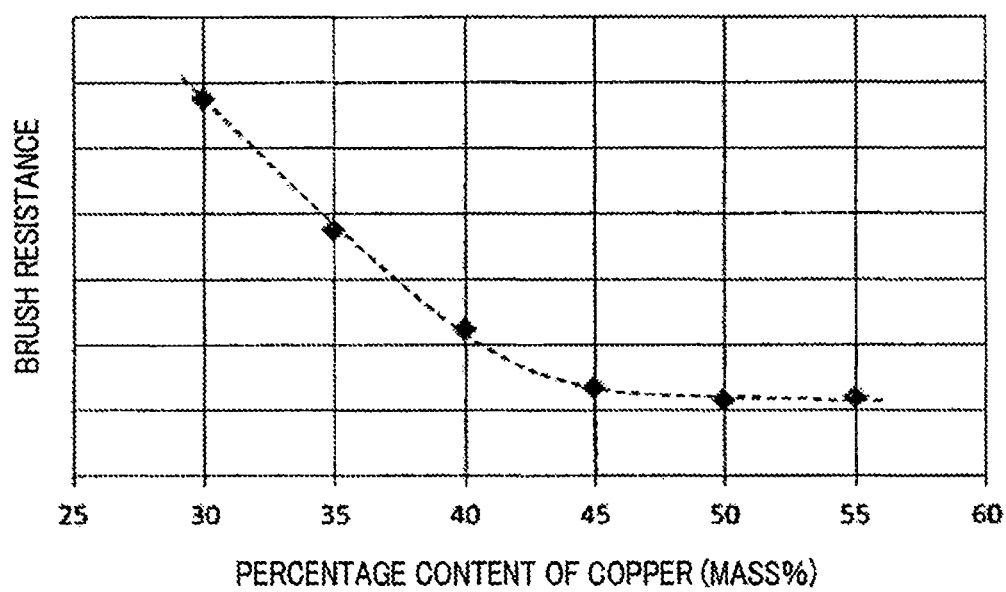
FIG. 11 is a graphical representation illustrating the relationship between the percentage content of copper in the first sintered compact and the resistance of the brush.

FIG. 11 shows the relationship between the percentage content of copper in the first sintered compact forming the first layer 31 of each of the brushes 30 and the brush resistance (i.e., the resistance of each of the brushes 30).

In addition, the relationship shown in FIG. 1 has also been determined by the experimental investigation conducted by the inventor. Specifically, in the experimental investigation, the percentage content of copper in the first sintered compact was varied with the total percentage content of the metal sulfide solid lubricants in the first sintered compact fixed to 7.2 mass % and the percentage content of brass in the first sintered compact fixed to 5.4 mass %; at each of a plurality of values of the percentage content of copper in the first sintered compact, the brush resistance was measured after leaving the brush 30 to stand in a high-temperature and high-humidity environment for a long period of time, more particularly at a temperature of 80° C. and a humidity of 90% for 250 hours.

As can be seen from FIG. 11, when the percentage content of copper in the first sintered compact is lower than 45 mass %, the influence of sulfuration of the copper contained in the first sintered compact becomes large, increasing the brush resistance. Moreover, it is clear from FIG. 11 that with the percentage content of brass in the first sintered compact set to be in the conventional range (i.e., about 5-6 mass %), it is impossible to prevent the copper contained in the first sintered compact from being sulfurized.

Figure 12:
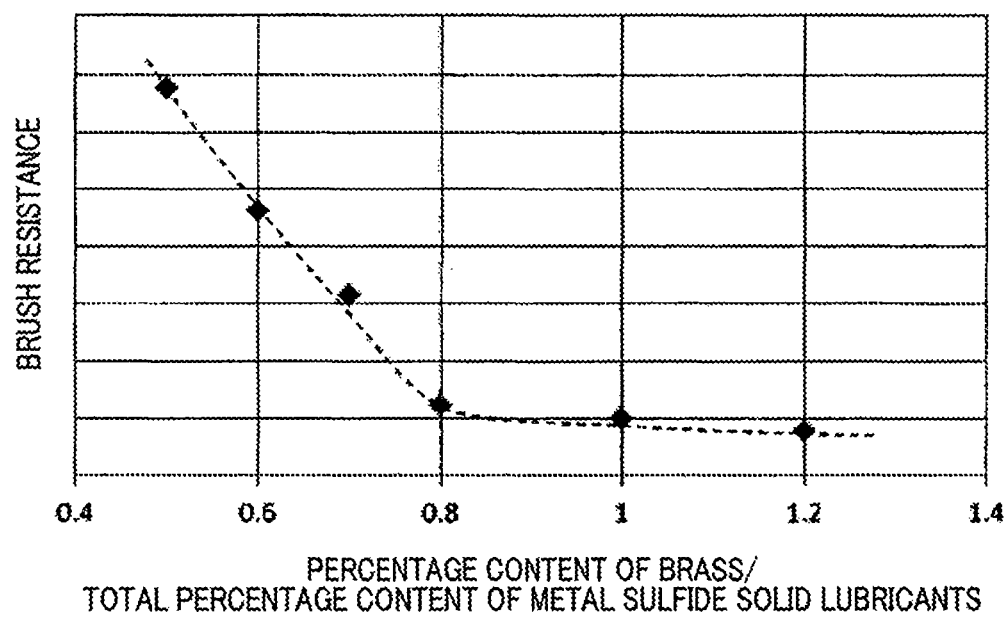
FIG. 12 is a graphical representation illustrating the relationship between the ratio of the percentage content of brass in the first sintered compact to the total percentage content of metal sulfide solid lubricants in the first sintered compact and the resistance of the brush.

FIG. 12 shows the relationship between the ratio of the percentage content by mass of brass in the first sintered compact to the total percentage content by mass of the metal sulfide solid lubricants in the first sintered compact and the brush resistance.

In addition, the relationship shown in FIG. 12 has also been determined by the experimental investigation conducted by the inventor. Specifically, in the experimental investigation, the percentage content of brass in the first sintered compact was varied with the percentage content of copper in the first sintered compact fixed to 45 mass % and the total percentage content of the metal sulfide solid lubricants in the first sintered compact fixed to 7.2 mass %; at each of a plurality of values of the percentage content of brass in the first sintered compact, the brush resistance was measured after leaving the brush 30 to stand in a high-temperature and high-humidity environment for a long period of time, more particularly at a temperature of 80° C. and a humidity of 90% for 250 hours.

As can be seen from FIG. 12, when the ratio of the percentage content by mass of brass in the first sintered compact to the total percentage content by mass of the metal sulfide solid lubricants in the first sintered compact is higher than or equal to 0.8, it is possible to suppress increase in the brush resistance even when the percentage content of copper in the first sintered compact is not higher than 45 mass %. For example, when the percentage content of copper in the first sintered compact is 45 mass %, the percentage content of tungsten disulfide in the first sintered compact is 7.2 mass % and the percentage content of molybdenum disulfide in the first sintered compact is 2.1 mass % (i.e., the total percentage content of the metal sulfide solid lubricants in the first sintered compact is 9.3 mass %), adding brass to in the first sintered compact by 7.5 mass %, it is possible to suppress increase in the brush resistance. In addition, in this case, the mass of copper contained in brass is not taken into account in calculating the percentage content of copper in the first sintered compact.

Of the components of brass, zinc can be more easily sulfurized than copper and thus contributes to both suppression of oxidation of copper and suppression of sulfuration of copper. Therefore, it is also possible to formulate the measurement results shown in FIG. 12 in terms of the percentage content by mass of zinc in the first sintered compact. Specifically, the mass of zinc contained in the brass used in the experimental investigation was about ⅔ of the mass of the brass. Accordingly, when the ratio of the percentage content by mass of zinc in the first sintered compact to the total percentage content by mass of the metal sulfide solid lubricants in the first sintered compact is higher than or equal to 0.3, it is possible to suppress increase in the brush resistance even when the percentage content of copper in the first sintered compact is not higher than 45 mass %.

Moreover, as described previously with reference to FIG. 4, in the TO present embodiment, each of the brushes 30 is multi-layer structured to include the first layer 31 and the second layer 32 that has a lower copper content and thus a higher resistance than the first layer 31. Moreover, the second layer 32 is arranged backward of the first layer 31 with respect to the direction of rotation of the commutator 20. Consequently, during rotation of the commutator 20, with respect to each of the commutator segments 21, the first layer 31 first makes sliding contact with the commutator segment 21 and then the second layer 32 makes sliding contact with the commutator segment 21; thus the second layer 32, whose resistance is higher than the resistance of the first layer 31, is brought out of the siding contact with the commutator segment 21 later than the first layer 31 is. As a result, it is possible to suppress generation of sparks due to the sliding contact.

Furthermore, in the present embodiment, the composition of the second sintered compact forming the second layer 32 is set to be different from the composition of the first sintered compact forming the first layer 31. Specifically, the percentage content of copper in the second sintered compact is 10-30 mass %. The percentage content of molybdenum disulfide in the second sintered compact is about 5 mass %. However, no tungsten disulfide is contained in the second sintered compact.

Tungsten disulfide is more hydrophilic than molybdenum disulfide. Therefore, if tungsten disulfide was contained in the second sintered compact whose copper percentage content is lower than the copper percentage content of the first sintered compact, the amount of moisture absorbed by the second layer 32 in a high-humidity environment would be large. Consequently, the moisture absorbed by the second layer 32 might he rapidly evaporated by heat, which is generated by electric current flowing through the second layer 32 whose resistance is higher than the resistance of the first layer 31, causing cracking of the brush 30.

In the present embodiment, though no tungsten disulfide is contained. in the second sintered compact, it is still possible to form a sufficient amount of the hard compounds through chemical reactions of tungsten disulfide contained in the first sintered compact and molybdenum disulfide contained in both the first and the second sintered compacts with graphite.

Figure 13:
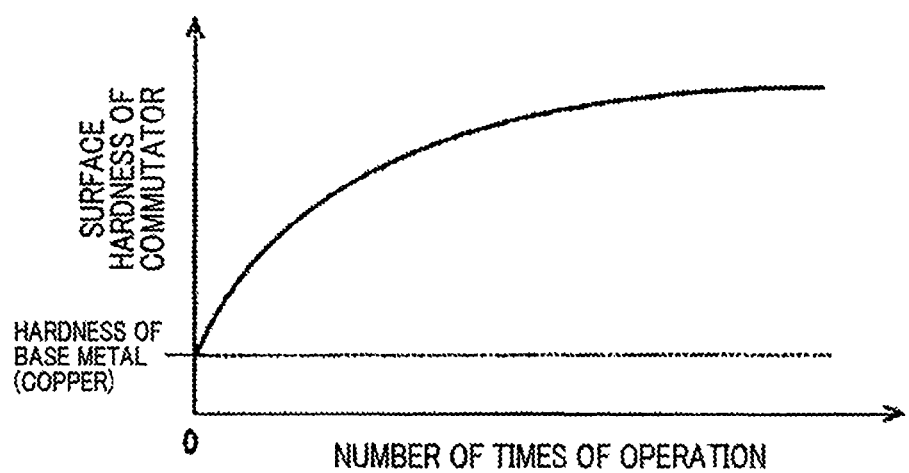
FIG. 13 is a graphical representation illustrating the relationship between the number of times the starter operates to start an engine and the surface hardness of the commutator.

FIG. 13 shows the relationship between the number of times the starter S operates to start the engine of the vehicle and the surface hardness of the commutator 20 when the first layer 31 of each of the brushes 30 is formed of the first sintered compact having the above-described composition.

It has been confirmed, through a durability test of the starter S conducted by the inventor of the present application, that after thousands of times of operation of the starter S, the graphite film 25 was formed which contains the hard compounds.

As can be seen from FIG. 13, in the durability test, with increase in the number of times of operation of the starter S, the graphite film 25 was formed on the surface 20A of the commutator 20 and thus the surface hardness of the commutator 20 was gradually increased from the hardness of the base metal of the commutator 20 (i.e., copper).

That is, in the present embodiment, the graphite film 25 is formed with operation of the DC motor 40 (or operation of the starter S), without performing any additional process. Consequently it becomes possible to form the graphite film 25 at low cost. Moreover, the materials of the graphite film 25 are originally included in the brushes 30 and transferred to the surface 20A of the commutator 20 to form the graphite film 25 with operation of the DC motor 40. Therefore, the graphite film 25 can be maintained to the end of the service life of the brushes 30.

With the graphite film 25 that is formed on the surface 20A of the commutator 20 and excellent in both hardness and lubricity, it is possible to suppress wear of the commutator 20, thereby extending the service life of the commutator 20. Further, by suppressing wear of the commutator 20, it is possible to suppress the dimensional accuracy of the commutator 20 (more specifically, the roundness in the case of the commutator 20 being of cylindrical type or the flatness in the case of the commutator 20 being of face type) from being lowered due to uneven wear of the commutator 20. Consequently, it is possible to suppress generation of sparks due to the lowering of the dimensional accuracy of the commutator 20, thereby extending the service life of the brushes 30 as well.

Moreover, with the graphite film 25, it is possible to effectively suppress wear of the uneven portion 22 of the commutator 20 formed on the radially outer periphery of the commutator 20. Consequently, it is possible to stabilize the sliding contact between the brushes 30 and the commutator 20 for a long period of time, thereby further extending the service life of the brushes 30.

In addition, it is preferable that in the first sintered compact forming the first layer 31 of each of the brushes 30, the percentage content of copper is 40 mass %, the percentage content of tungsten disulfide is 7.8 mass %, the percentage content of molybdenum disulfide is 2.6 mass %, the percentage content of brass is 10.4 mass %, and the remainder is graphite and additives such as an abrasive. Moreover, the voltage applied to the DC motor 40 when starting the engine at an ambient temperature of for example, 25° C. is about 12V; the electric current flowing in the DC motor 40 during operation of the DC motor 40 may exceed 100 A. Employing the above-described brushes 30 in such a DC motor, it is possible to reliably form the graphite film 25 on the surface 20A of the commutator 20.

According to the present embodiment, it is possible to achieve the following advantageous effects. in the present embodiment, the DC motor 40 is employed in the starter S that is designed to be used in a vehicle, which is equipped with an idle stop system, to start an engine of the vehicle. The DC motor 40 includes the commutator 20 and the brushes 30. The commutator 20 is formed of copper or a copper alloy whose copper percentage content is higher than or equal to 99 mass %. The brushes 30 are arranged in sliding contact with the commutator 20. Each of the brushes 30 is formed of the sintered compact that consists of the first sintered compact forming the first layer 31 and the second sintered compact forming the second layer 32. The first sintered, compact contains graphite, copper and the metal sulfide solid lubricants (i.e., tungsten disulfide and molybdenum disulfide). The percentage content of copper in the first sintered compact is 30-70 mass %. The percentage content of tungsten disulfide in the first sintered compact is higher than or equal to 6.5 mass %.

With the above configuration, during operation of the DC motor 40, the tungsten disulfide contained in the first sintered compact reacts with graphite due to heat generated by supply of electric power to the DC motor 40 and the sliding movement between the brush 30 and the commutator 20. Consequently, the tungsten disulfide is changed into tungsten carbide which is a hard compound. As a result, tungsten carbide is contained in the graphite film 25 formed on the surface 20A of the commutator 20, thereby improving the hardness of the graphite film 25 to become higher than the hardnesses of conventional graphite films.

That is, in the DC motor 40, the graphite film 25 is not originally formed on the surface 20A of the commutator 20. Instead, the graphite film 25 is formed with operation of the DC motor 40, without performing any additional process. Consequently, it becomes possible to form the graphite film 25 at low cost. Moreover, the graphite film 25 is continuously formed with the sliding movement between each of the brushes 30 and the commutator 20. Therefore, the graphite film 25 can be maintained to the end of the service life of the brushes 30.

Furthermore, part of the tungsten disulfide transferred from the brushes 30 to the graphite film 25 remains in its original form (i.e., not changed into tungsten carbide). That is, the graphite film 25 contains tungsten disulfide that is a metal sulfide solid lubricant Consequently, the graphite film 25 is excellent in lubricity as well as in hardness.

Accordingly, with the graphite film 25 formed on the surface 20A of the commutator 20, it is possible to suppress wear of the commutator 20, thereby extending the service life of the commutator 20. Further, by suppressing, wear of the commutator 20, it is possible to suppress the dimensional accuracy of the commutator 20 from being lowered due to uneven wear of the commutator 20. Consequently, it is possible to suppress generation of sparks due to the lowering of the dimensional accuracy of the commutator 20, thereby extending the service life of the brushes 30 as well.

It is preferable that the percentage content of tungsten disulfide in the first sintered compact forming the first layer 31 of each of the brushes 30 is higher than or equal to 7 mass %.

Setting the percentage content of tungsten disulfide in the first sintered to compact as above, it is possible to facilitate generation of tungsten carbide, thereby increasing the hardness of the graphite film 25. Consequently, it is possible to more reliably suppress wear of the commutator 20.

In the present embodiment, the first sintered compact forming the first layer 31 of each of the brushes 30 further contains molybdenum disulfide in addition to tungsten disulfide. The percentage content of molybdenum disulfide in the first sintered compact is higher than or equal to 2 mass %.

With the above configuration, during operation of the DC motor 40, the molybdenum disulfide contained in the first sintered compact reacts with graphite due to heat generated by supply of electric power to the DC motor 40 and the sliding movement between the brush 30 and the commutator 20. Consequently, the molybdenum disulfide is changed into molybdenum carbide which is a hard compound. As a result, molybdenum carbide is contained, together with tungsten carbide, in the graphite film 25 formed on the surface 20A of the commutator 20. Hence, compared to the case of the graphite film 25 containing only tungsten carbide as a hard compound, it is possible to further improve the hardness of the graphite film 25, thereby more reliably suppressing wear of the commutator 20.

With increase in the percentage content of the metal sulfide solid lubricants (i.e., tungsten disulfide and molybdenum disulfide) in the brushes 30, sulfuration of copper contained in the brushes 30 in a high-temperature and high-humidity environment by sulfur contained in the metal sulfide solid lubricants may become remarkable. In particular, when the percentage content of copper in the brushes 30 is low, the brush resistance (i.e., the resistance of each of the brushes 30) may be considerably increased due to sulfuration of copper contained in the brushes 30.

In consideration of the above, in the present embodiment, hen the percentage content of copper in the first sintered compact is not higher than 45 mass %, zinc is added to the first sintered compact to such an extent that the ratio of the percentage content by mass of zinc in the first sintered compact to the total percentage content by mass of the metal sulfide solid lubricants in the first sintered compact is higher than or equal to 0.3. More particularly, in the present embodiment, brass, which contains zinc, is added to the first sintered compact to such an extent that the ratio of the percentage content by mass of brass in the first sintered compact to the total percentage content by mass of the metal sulfide solid. lubricants in the first sintered compact is higher than or equal to 0.8.

With the above configuration, since zinc can be more easily sulfurized than copper, it is possible to suppress increase in the brush resistance due to sulfuration of copper contained in the brushes 30 even when the percentage content of copper in the first sintered compact is not higher than 45 mass %. Consequently, it is possible to suppress wear of the commutator 20 while suppressing increase in the brush resistance.

In the present embodiment, each of the brushes 30 is multi-layer structured to include the first layer 31 and the second layer 32 that are arranged in alignment with each other in the direction of rotation of the commutator 20. The second layer 32 has a smaller thickness than the first layer 31 in the direction of rotation of the commutator 20. The first layer 31 is formed of the first sintered compact and the second layer 32 is formed of the second sintered compact. The percentage content by mass of copper in the second sintered compact is lower than the percentage content by mass of copper in the first sintered compact. No tungsten disulfide is contained in the second sintered compact.

That is, in the present embodiment, to suppress generation of sparks between the commutator 20 and the brushes 30, each of the brushes 30 includes the second layer 32 that is formed of the second sintered compact whose copper percentage content by mass is lower than the copper percentage content by mass of the first sintered compact forming the first layer 31. On the other hand, tungsten disulfide is more hydrophilic than molybdenum disulfide. Therefore, if tungsten disulfide was contained in the second sintered compact, the amount of moisture absorbed by the second layer 32 in a high-humidity environment would be large. Consequently, the moisture absorbed by the second layer 32 might be rapidly evaporated by heat, which is generated by electric current flowing through the second layer 32 whose resistance is higher than the resistance of the first layer 31, causing cracking, of the brush 30. In consideration of the above, in the present embodiment, no tungsten disulfide is contained in the second sintered compact.

In addition, in the present embodiment, though no tungsten disulfide is contained in the second sintered compact, it is still possible to form a sufficient amount of the hard compounds through chemical reactions of tungsten disulfide contained in the first sintered compact and molybdenum disulfide contained in both the first and second sintered compacts with graphite. Consequently, it is still possible to reliably suppress wear of the commutator 20.

While the above particular embodiment has been shown and described, it will be understood by those skilled in the art that various modifications, changes, and improvements may be made without departing from the spirit of the present disclosure.

For example, in the above-described embodiment, each of the brushes 30 is multi-layer structured to include the first and second layers 31 and 32 that are formed respectively of the first and second sintered compacts. As an alternative, each of the brushes 30 may be single-layer structured to include only the first layer 31 that is funned of the first sintered compact.

In the above-described embodiment, the first sintered compact forming the first layer 31 of each of the brushes 30 contains both tungsten disulfide and molybdenum disulfide. As an alternative, the first sintered compact may contain only tungsten disulfide as a metal sulfide solid lubricant; the percentage content of tungsten disulfide in the first sintered compact is higher than or equal to 6.5 mass %.

What is claimed is:

1. A DC motor for a starter that starts an engine, the DC motor comprising:
   a commutator formed of copper or a copper alloy whose copper percentage content is higher than or equal to 99 mass %; and
   a brush arranged in sliding contact with a surface of the commutator, wherein
   the brush is formed of a sintered compact that contains graphite, copper and at least one metal sulfide solid lubricant,
   a percentage content of copper in the sintered compact is 30-70 mass %,
   the at least one metal sulfide solid lubricant comprises tungsten disulfide, and
   a percentage content of tungsten disulfide in the sintered compact is higher than or equal to 6.5 mass %.

2. The DC motor as set forth in claim 1, wherein the percentage content of tungsten disulfide in the sintered compact is higher than or equal to 7 mass %.

3. The DC motor as set forth in claim 2, wherein the at least one metal sulfide solid lubricant further comprises molybdenum disulfide, and a percentage content of molybdenum disulfide in the sintered compact is higher than or equal to 2 mass %.

4. The DC motor as set forth in claim 3, herein the sintered compact further contains zinc,
   the percentage content of copper in the sintered compact is not higher than 45 mass %, and
   a ratio of a percentage content by mass of zinc in the sintered compact to a total percentage content by mass of the at least one metal sulfide solid lubricant in the sintered compact is higher than or equal to 0.3.

5. The DC motor as set forth in claim 4, Wherein the sintered compact is a first sintered compact,
   the brush includes a first layer and a second layer that are arranged in alignment with each other in a direction of rotation of the commutator,
   the second layer has a smaller thickness than the first layer in the direction of rotation of the commutator,
   the first layer is formed of the first sintered compact and the second layer is formed of a second sintered compact,
   a percentage content by mass of copper in the second sintered compact is lower than the percentage content by mass of copper in the first sintered compact, and
   no tungsten disulfide is contained in tine second sintered compact.

6. The DC motor as set forth in claim 3, wherein the sintered compact further contains brass,
   the percentage content of copper in the sintered compact is not higher than 45 mass %, and
   a ratio of a percentage content by mass of brass in the sintered compact to a total percentage content by mass of the at least one metal sulfide solid lubricant in the sintered compact is higher than or equal to 0.8.

7. The DC motor as set forth in claim 6, wherein the sintered compact is a first sintered compact,
   the brush includes a first layer and a second layer that are arranged in alignment with each other in a direction of rotation of the commutator,
   the second layer has a smaller thickness than the first layer in the direction of rotation of the commutator,
   the first layer is formed of the first sintered compact and the second layer is formed of a second sintered compact,
   a percentage content by mass of copper in the second sintered compact is lower than the percentage content by mass of copper in the first sintered compact, and
   no tungsten disulfide is contained in the second sintered compact.

8. The DC motor as set forth in claim 1, wherein the at least one metal sulfide solid lubricant further comprises molybdenum disulfide, and
   a percentage content of molybdenum disulfide in the sintered compact is higher than or equal to 2 mass %.

9. The DC motor as set forth in claim 1, wherein the sintered compact further contains zinc,
   the percentage content of copper in the sintered compact is not higher than 45 mass %, and
   a ratio of a percentage content by mass of zinc in the sintered compact to a total percentage content by mass of the at least one metal sulfide solid lubricant in the sintered compact is higher than or equal to 0.3.

10. The DC motor as set forth in claim 1, wherein the sintered compact further contains brass,
    the percentage content of copper in the sintered compact is not higher than 45 mass %, and
    a ratio of a percentage content by mass of brass in the sintered compact to a total. percentage content by mass of the at least one metal sulfide solid lubricant in the sintered compact is higher than or equal to 0.8.

11. The DC motor as set forth in claim 1, wherein the sintered compact is a first sintered compact,
    the brush includes a first layer and a second layer that are arranged in alignment with each other in a direction of rotation of the commutator,
    the second layer has a smaller thickness than the first layer in the direction of rotation of the commutator,
    the first layer is formed of the First sintered compact and the second layer is formed of a second sintered compact,
    a percentage content by mass of copper in the second sintered compact is lower than the percentage content by mass of copper in the first sintered compact, and
    no tungsten disulfide is contained in the second sintered compact.

* * * * *